Feb. 14, 1933.  J. F. GRAHAM  1,897,117
POWER OPERATED HEDGE CLIPPERS
Filed Dec. 23, 1931  2 Sheets-Sheet 1
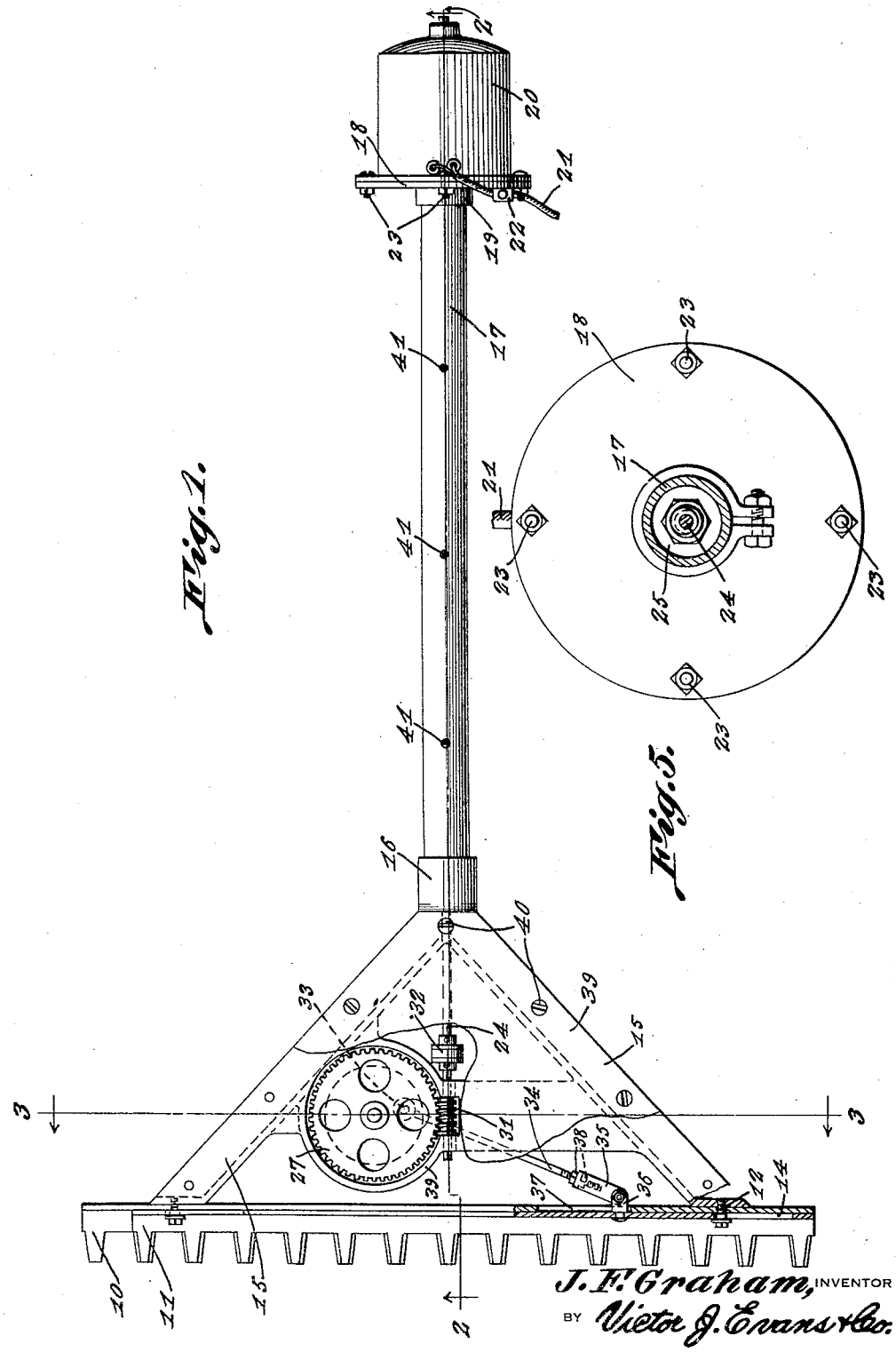
J. F. Graham, INVENTOR
BY Victor J. Evans & Co.
ATTORNEY

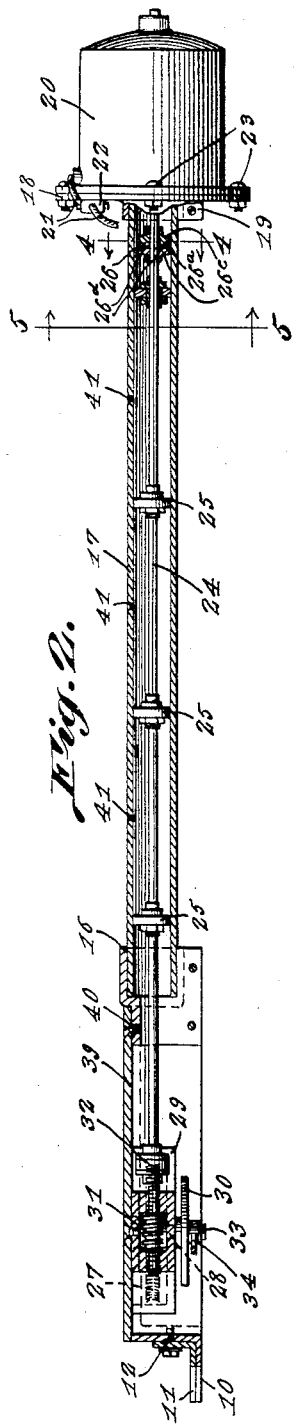

Patented Feb. 14, 1933

1,897,117

UNITED STATES PATENT OFFICE

JOSHUA FAIRCHILD GRAHAM, OF MAYNARD, MASSACHUSETTS

POWER OPERATED HEDGE CLIPPERS

Application filed December 23, 1931. Serial No. 582,833.

The object of the invention is to provide a tool particularly adapted for trimming hedges, so that a uniform contour throughout may be given to the same with a minimum of care on the part of the operator; to provide a tool of this kind which is power actuated, so that the operator is relieved of the strain and fatigue attending the trimming operation; and to provide a hedge trimmer which is of simple form, reduced to a small number of parts for power operation and which is of a character susceptible of cheap manufacture.

With this object in view, the invention consists in a construction and combination of parts of which a preferred embodiment is illustrated in the accompanying drawings but to which the invention is not to be restricted. Actual reduction to practice may dictate certain changes or alterations and the right is claimed to make any which fall within the scope of the appended claim.

In the drawings:

Figure 1 is a plan view, partly broken away, of a clipper or trimmer constructed in accordance with the invention.

Figures 2 and 3 are sectional views on the planes indicated by the lines 2—2 and 3—3 respectively of Figure 1.

Figures 4 and 5 are transverse sectional views on the planes indicated by the lines 4—4 and 5—5 respectively of Figure 2.

The cutting elements comprised in the invention are the relatively movable cutter bars 10 and 11 which are preferably made from tool steel of transversely angular form, so that the cutter bar 11 may lie in the angle of the cutter bar 10 to be slidably connected with the latter by means of the screws 12 which pass through slots 14 in the bar 11 and through a body hole in the flange of the bar 10, the screws serving to effect rigid connection between the bar 10 and the head frame 15.

The cutter bars 10 and 11 are of toothed form, the cutting edges being on the side edges of the teeth. Relative movement of the bars effects passage of the teeth on one across the teeth on the other, so that any stems or stalks between the teeth may be severed.

The head frame 15 is made preferably of some light material such as aluminum and may be cast or die form, consisting of diverging arms to the extremities of which the bar 10 is secured by the screws 12 as aforesaid.

The head frame 15 at the heel is formed with a handle receiving socket 16 in which the tubular handle member 17 is received, the latter at the end remote from the head frame carrying a base plate 18 provided with a circumferential contractile clamp member 19 by which the base plate is secured to the handle. The base plate 18 functions as a mounting base for the motor 20 which is provided with a flexible electric feed conductor 21 within which is interposed a control switch 22 mounted on the under face of the base member 18.

Bolts 23 serve as means for securing the motor to the base plate.

The motor functions as the operating means for effecting relative movement of the cutter bars 10 and 11 and to this end its drive shaft is coupled to a transmission shaft 24, housed in the handle 17 and journalled in self-aligning bearings 25, spaced uniformly along the handle, connection between the motor shaft and the transmission shaft being accomplished through the instrumentality of a universal joint 26.

The universal joint 26 in the illustrated embodiment consists of a disk 26$^a$ formed with uniformly spaced openings 26$^b$ disposed preferably 90 degrees apart. The members 26$^c$, of which there are two, mounted one each on the motor shaft and the transmission shaft, are provided with diametrically disposed lugs 26$^d$, those on one of the members 26$^c$ entering one pair of holes 26$^b$ in the disk and those on the other member entering the remaining holes. Since the motor drive shaft will in every instance almost fall in alignment with the transmission shaft, the universal coupling is called upon only to compensate for slight variations in alignment.

The head frame 15 carries a worm gear 27 mounted on a shaft 28 journalled one end in the head frame and the other end in a housing 29, the shaft extending through the wall of the housing 29 on which extending end the drive disk 30 is mounted. In mesh with the worm gear is a worm 31 whose shaft is appropriately journalled in the housing and has one end coupled to the transmission shaft by means of a universal coupling 32, of similar construction to the universal coupling 26. Obviously, rotation of the motor imparts rotation to the transmission shaft from which motion is communicated to the worm and worm wheel by which latter the drive disk 30 is set in motion. The drive disk is provided with a wrist pin 33, with which a link 34 is connected, the latter being formed with a terminal ear 35 pivotally connected with an ear 36 which is carried by the cutter bar 11 and extends through a slot 37 in the flange of the cutter bar 10. The ear 35 has an adjustable connection with the link 34 consisting of nuts 38 engaged with the threaded extremity of the link abutting the ear 35 on opposite sides. By this construction, the length of the link may be varied, so that the cutter bar 11 may be positioned initially with reference to the cutter bar 10 to provide for the most effective limits of movement between the two.

The head frame is covered on one side with a cover plate 39 secured in place by screws 40 and this cover plate acts as a platform on which pieces clipped from the hedge being trimmed may be deposited, rather than being dropped on the ground, as would be the case, due to the open construction of the head frame, if the latter were left uncovered.

In performing the hedge clipping or trimming operation, it is only necessary to start the motor with the actuation of the switch 22, when the disk 30 will be set in motion and the cutter bar 11 precipitated over the cutter bar 10, due to the operative connection between the disk and the cutter bar 11. Proper holding of the tool will bring the cutter bar into engagement with the branches of the hedge to be trimmed and any projecting portions will be immediately severed by the cooperating cutter bars and this without any effort on the part of the operator, other than to hold the device in the proper position.

In order to provide for sufficient lubrication of the transmission shaft 24, the tubular handle member 17 is provided with oil holes 41 at points between the self-aligning bearings 25. Thus, the handle may be charged with lubricant through the holes, so that it may find its way to the intermediate supporting bearings for the transmission shaft.

The invention having been described, what is claimed as new and useful is:

A tool for the purpose indicated comprising relatively movable cutter bars of cross-sectionally angular form with the one disposed in the angle of the other, the flange of the upper cutter bar being formed with longitudinal slots, screws engaged in the flange of the lower bar and passing through said slots to provide for sliding movement of the upper bar on the lower bar, a head frame comprising divergent arms to the extremities of which the lower bar is secured, the head frame being formed with a handle receiving socket at the point of juncture of said arms, a rotary member mounted on the head frame between said arms and having a link connection with the upper of said bars to reciprocate the latter as said member rotates, and driving means for said member.

In testimony whereof I affix my signature.

JOSHUA FAIRCHILD GRAHAM.